US009080040B2

(12) United States Patent
Fonseca et al.

(10) Patent No.: US 9,080,040 B2
(45) Date of Patent: Jul. 14, 2015

(54) SOUND DEADENER COMPOSITION WITH EMULSION POLYMER AND FLUORINATED COMPOUND

(71) Applicant: BASF SE, Ludwigshafen (DE)

(72) Inventors: Gledison Fonseca, Mannheim (DE); Dirk Wulff, Schifferstadt (DE); Axel Weiss, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/012,333

(22) Filed: Aug. 28, 2013

(65) Prior Publication Data

US 2014/0349018 A1 Nov. 27, 2014

Related U.S. Application Data

(62) Division of application No. 13/211,856, filed on Aug. 17, 2011, now abandoned.

(60) Provisional application No. 61/375,052, filed on Aug. 19, 2010.

(51) Int. Cl.
*C08K 13/02* (2006.01)
*C09D 5/02* (2006.01)
*G10K 11/165* (2006.01)

(52) U.S. Cl.
CPC ............... *C08K 13/02* (2013.01); *C09D 5/024* (2013.01); *G10K 11/165* (2013.01)

(58) Field of Classification Search
None
See application file for complete search history.

(56) References Cited

U.S. PATENT DOCUMENTS

| | | | | |
|---|---|---|---|---|
| 4,410,563 A * | 10/1983 | Richter et al. | ................. | 427/108 |
| 5,169,902 A * | 12/1992 | Yagi et al. | ...................... | 525/301 |
| 5,494,981 A * | 2/1996 | Gorodisher et al. | .......... | 525/504 |
| 5,498,657 A * | 3/1996 | Sugiyama et al. | ............ | 524/463 |
| 6,387,172 B1 | 5/2002 | Yu et al. | | |
| 6,486,245 B1 * | 11/2002 | Thunemann et al. | ......... | 524/130 |
| 6,502,821 B2 | 1/2003 | Schneider | | |
| 6,624,944 B1 | 9/2003 | Wallace et al. | | |
| 2002/0053655 A1 * | 5/2002 | Maes et al. | ....................... | 252/73 |
| 2002/0112651 A1 | 8/2002 | Yu et al. | | |
| 2004/0033354 A1 | 2/2004 | Fisher et al. | | |
| 2005/0101697 A1 * | 5/2005 | Morihiro et al. | ............. | 523/201 |

FOREIGN PATENT DOCUMENTS

| | | |
|---|---|---|
| DE | 199 54 619 A1 | 5/2001 |
| DE | 20 2010 001 353 U1 | 5/2010 |
| EP | 0 081 083 A2 | 6/1983 |
| EP | 1520865 A2 | 4/2005 |
| JP | 4-76030 | 3/1992 |
| WO | WO 01/81264 A1 | 11/2001 |
| WO | WO 2007/034933 A1 | 3/2007 |

OTHER PUBLICATIONS

Sadeghipourt et al, Smart Mater., 1, pp. 172-179, 1992.*
Karaman et al, Colloids and Surfaces A: Physicochemical and Engineering Aspects 182, pp. 285-298, 2001.*
D. D. L. Chung, "Review Materials for vibration damping", Journal of Materials Science, 36, 2001, pp. 5733-5737.
European Search Report issued Dec. 6, 2011, in Patent Application No. EP 11 17 7624 (with English Translation on Category of Cited Documents).

* cited by examiner

*Primary Examiner* — Erma Cameron
(74) *Attorney, Agent, or Firm* — Oblon, McClelland, Maier & Neustadt, L.L.P.

(57) ABSTRACT

A description is given of a sound deadener composition comprising a polymer dispersion comprising (a) at least one water-dispersed polymer obtainable by emulsion polymerization of free-radically polymerizable monomers and having a glass transition temperature in the range from −60 to +60° C.; (b) inorganic fillers; and (c) at least one fluorinated compound selected from perfluoroalkyl-substituted carboxylic acids and their salts, fluorocarbon resins, surface-active, fluoroaliphatic polymeric esters, and fluorine-containing, acrylate-based copolymers. A description is also given of a method for damping oscillations or vibrations of components of vehicles and machines, using the sound deadener composition of the invention.

18 Claims, No Drawings

SOUND DEADENER COMPOSITION WITH EMULSION POLYMER AND FLUORINATED COMPOUND

CROSS REFERENCE TO RELATED APPLICATION(S)

This application is a divisional of U.S. patent application Ser. No. 13/211,856 filed on Aug. 17, 2011, the entire content of which is incorporated herein by reference, and which claims priority to U.S. provisional application Ser. No. 61/375,052, filed Aug. 19, 2010.

The invention relates to a sound deadener composition comprising a polymer dispersion comprising (a) at least one water-dispersed polymer obtainable by emulsion polymerization of free-radically polymerizable monomers and having a glass transition temperature in the range from −60 to +60° C.; (b) inorganic fillers; and (c) at least one fluorinated compound selected from perfluoroalkyl-substituted carboxylic acids and their salts, fluorocarbon resins, surface-active, fluoroaliphatic polymeric esters, and fluorine-containing, acrylate-based copolymers. The invention also relates to a method for damping oscillations or vibrations of vehicle and machine components.

Oscillations or vibrations of machinery or vehicle components generate unwanted noise. For noise reduction, the components can be treated with what are called sound deadener compositions, also referred to as LASD (liquid applied sound damping) compositions. Vibration-damping materials are described, for example, in Journal of Materials Science 36 (2001) 5733-5737, US 2004/0033354, and U.S. Pat. No. 6,502,821. Geometrically complex, three-dimensional components can be treated by spray application of a sound deadener composition in the form of an aqueous dispersion. Dispersions of this kind generally comprise a dispersed viscoelastic polymer and inorganic fillers. Vibration-damping compositions based on water-based polymer dispersions and inorganic fillers along with further auxiliaries are known from EP 1520865 and from WO 2007/034933. A disadvantage of existing sound deadener compositions based on polymer dispersions is that the coatings produced therewith on components in the rain or high atmospheric moisture can absorb water, which can lead to unwanted corrosion or decay. Therefore, the desire is for sound deadener compositions with which coatings can be produced which produce a water absorption which is as low as possible under the influence of moisture. It was an object of the present invention to provide such sound deadener compositions.

It has been found that the water absorption behavior can be improved by certain fluorinated additives. The invention accordingly provides a sound deadener composition comprising (a) a polymer dispersion comprising at least one polymer which is obtainable by emulsion polymerization of free-radically polymerizable monomers and is dispersed in water, having a glass transition temperature in the range from −60 to +60° C.;
(b) inorganic fillers; and
(c) at least one fluorinated compound selected from the group consisting of perfluoroalkyl-substituted carboxylic acids and their salts, fluorocarbon resins, surface-active, fluoroaliphatic polymeric esters, and fluorine-containing, acrylate-based copolymers.

One preferred use of the sound deadener composition of the invention is the use for vibration damping of vehicle bodywork parts.

In accordance with the invention, the water absorption capacity of sound deadener compositions is reduced using perfluoroalkyl-substituted carboxylic acids and their salts, fluorocarbon resins, surface-active, fluoroaliphatic polymeric esters, and fluorine-containing, acrylate-based copolymers. The fluorocarbon resins are preferably perfluorinated, alkyl-substituted, i.e., perfluoroalkyl-substituted carboxylic acid resins or salts thereof, or aliphatic, N,N-di-perfluoroalkyl-substituted monoamino-monocarboxylic acids or their salts. Reference below to acids also applies always to their salts. The fluorinated compounds are present in the sound deadener composition of the invention preferably in an amount of 0.1% to 3% by weight or of 0.1% to 2% by weight, more particularly of 0.2% to 0.5% by weight.

Preferred perfluoroalkyl-substituted carboxylic acids and their salts have at least one or two perfluoroalkyl groups of the formula —$C_nCF_{2n+1}$, the perfluoroalkyl groups being linear or branched, preferably linear, n being a number from 1 to 16, preferably 4 to 14 or 6 to 12, and the salts being selected from ammonium salts, alkali metal salts, and alkaline earth metal salts. Suitable perfluoroalkyl-substituted carboxylic acid salts are, for example, Lodyne®2010 and Lodyne®2000.

Also suitable in particular are mixtures of compounds having different perfluoroalkyl groups, an example being a mixture of
1-15% by weight of compounds with n=6,
25-70% by weight of compounds with n=8,
15-50% by weight of compounds with n=10, and
5-20% by weight of compounds with n=12.

Where the fluorinated compounds are in the form of carboxylic acid salts, the cation that is necessary for charge equalization is preferably ammonium, an alkali metal, preferably lithium, sodium or potassium, or an alkaline earth metal, preferably magnesium, calcium or aluminum.

Suitable perfluoroalkyl-substituted carboxylic acids are also perfluoroalkyl-substituted monoaminomonocarboxylic acids, more particularly N,N-di-perfluoroalkyl-substituted monoaminomonocarboxylic acids. The N,N-di-perfluoroalkyl-substituted monoaminomonocarboxylic acids and the perfluoroalkyl-substituted carboxylic acids of the invention are used either as compounds with a defined molecular weight or as a mixture of compounds having different molecular weights, or as a mixture of compounds of different structural types. The N,N-di-perfluoroalkyl-substituted monoaminomonocarboxylic acids and the perfluoroalkyl-substituted carboxylic acids may also be present, furthermore, in polymerized form. Other classes of substance which are used in accordance with the invention for reducing the water absorption capacity of sound deadener compositions are surface-active fluoroaliphatic polymer esters and fluorine-containing, acrylate-based copolymers. The sound deadener composition comprises at least one compound from at least one of these classes of substance—perfluoroalkyl-substituted carboxylic acids, fluorocarbon resins, surface-active fluoroaliphatic polymeric esters, and fluorine-containing, acrylate-based copolymers.

The polymer dispersions of the invention are dispersions of polymers in an aqueous medium. This may, for example, be exclusively water or else may be mixtures of water and a solvent which is miscible therewith, such as methanol, ethanol or tetrahydrofuran. It is preferred not to use organic solvents. The solids contents of the dispersions are preferably from 15% to 75%, more preferably from 40% to 60%, more particularly greater than 50%, by weight. The solids content may be accomplished, for example, by appropriate adjustment of the amount of water used in the emulsion polymerization, and/or of the monomer amounts. The average particle size of the polymer particles dispersed in the aqueous dispersion is preferably smaller than 400 nm, more particularly smaller than 300 nm. With particular preference the average particle size is between 140 and 250 nm. By average particle size here is meant the $d_{50}$ of the particle size distribution, i.e., 50% by weight of the total mass of all the particles has a particle diameter smaller than the $d_{50}$. The particle size distribution can be determined in a known way using the analytical ultracentrifuge (W. Mächtle, Makromolekulare Chemie 185 (1984), pages 1025-1039). The pH of the polymer dispersion is adjusted preferably to a pH of more than 4, more particularly to a pH of between 5 and 9.

The polymers prepared by emulsion polymerization are polymers obtainable by free-radical polymerization of ethylenically unsaturated compounds (monomers), e.g., acrylate homopolymers, acrylate copolymers or acrylate copolymer blends. The polymer is composed preferably of at least 40% or of at least 60%, or of at least 80%, more preferably of at least 90% or of 100%, by weight, of one or more of the principal monomers described below. The principal monomers are preferably selected from C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Nature and amount of the monomers are preferably such that the glass transition temperature of the polymer prepared by emulsion polymerization is in the range from −60° C. to less than or equal to +60° C., more preferably in the range from −30 to +60° C. or from −20 to +55° C. The glass transition temperature can be determined by differential scanning calorimetry (ASTM D 3418-08, midpoint temperature).

Suitable monomers are, for example, (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate. Also suitable more particularly are mixtures of the (meth)acrylic acid alkyl esters. Vinyl esters of carboxylic acids having 1 to 20 C atoms are, for example, vinyl laurate, vinyl stearate, vinyl propionate, vinyl esters of Versatic acid, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Preferred vinyl ethers are those of alcohols comprising 1 to 4 C atoms. Suitable hydrocarbons having 4 to 8 C atoms and two olefinic double bonds are, for example, butadiene, isoprene, and chloroprene.

Preferred principal monomers are $C_1$ to $C_{10}$ alkyl acrylates and $C_1$ to $C_{10}$ alkyl methacrylates, more particularly $C_1$ to $C_8$ alkyl acrylates and methacrylates, and vinylaromatics, more particularly styrene, and mixtures thereof. Especially preferred are methyl acrylate, methyl methacrylate, ethyl acrylate, n-butyl acrylate, n-hexyl acrylate, octyl acrylate, and 2-ethylhexyl acrylate, 2-propylheptyl acrylate, styrene, and mixtures of these monomers. More particularly the polymers are composed of at least 60%, more preferably of at least 80%, and very preferably of at least 90% or at least 95%, by weight, of $C_1$ to $C_{10}$ alkyl (meth)acrylates.

In addition to the principal monomers, the polymer may comprise further monomers, examples being ethylenically unsaturated monomers having carboxylic, sulfonic or phosphonic acid groups (acid monomers). Carboxylic acid groups are preferred. One embodiment uses acid monomers at at least 0.1% by weight, preferably from 0.1% to 10% by weight, or from 0.5% to 8% by weight, or from 1% to 6% by weight, based on the polymer. Acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having preferably 3 to 6 C atoms in the molecule. Examples of such are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate, and sulfopropyl methacrylate. Preference is given to acrylic acid and methacrylic acid and the mixture thereof, more preferably to acrylic acid. The monomers containing acid groups may be used in the form of the free acids and also in a form in which they are partly or fully neutralized with suitable bases, for the polymerization. Neutralizing agents used with preference include aqueous sodium or potassium hydroxide solution or ammonia.

Further monomers are also, for example, monomers comprising hydroxyl groups, more particularly $C_1$-$C_{10}$ hydroxyalkyl(meth)acrylate, or (meth)acrylamide. Other further monomers include phenyloxyethylglycol mono(meth)acrylate, glycidyl (meth)acrylate, and aminoalkyl(meth)acrylates such as 2-aminoethyl (meth)acrylate, for example. Alkyl groups have preferably from 1 to 20 C atoms. Other further monomers include crosslinking monomers.

The polymer is composed more particularly of at least 60%, more preferably of at least 80%, e.g., from 60% to 100%, and very preferably of at least 95% or of 100%, by weight, of at least one $C_1$ to $C_{20}$ alkyl acrylate, at least one $C_1$ to $C_{20}$ alkyl methacrylate, a mixture thereof, or a mixture thereof with styrene.

The polymers can be prepared by emulsion polymerization, the product then being an emulsion polymer. In the course of the emulsion polymerization it is usual to use ionic and/or nonionic emulsifiers and/or protective colloids, or stabilizers, as interface-active compounds in order to assist the dispersing of the monomers in the aqueous medium. A comprehensive description of suitable protective colloids is found in Houben-Weyl, Methoden der organischen Chemie, volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifers, whose molecular weights, in contradistinction to those of the protective colloids, are typically below 2000 g/mol. Where mixtures of surface-active substances are used, the individual components must of course be compatible with one another, something which in case of doubt can be verified by means of a few preliminary tests. It is preferred to use anionic and nonionic emulsifiers as surface-active substances. Suitable emulsifiers are, for example, ethoxylated $C_8$ to $C_{36}$- or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkyl-phenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group.

Further suitable emulsifiers are compounds of the general formula

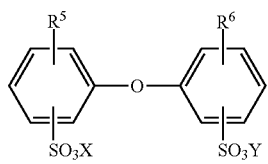

in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 C atoms or hydrogen, and more particularly having 6, 12, and 16 C atoms, and $R^5$ and $R^6$ are not both simultaneously hydrogen. X and Y are preferably sodium, potassium or ammonium ions, with sodium being particularly preferred. Particularly advantageous are compounds II in which X and Y are sodium, $R^5$ is a branched alkyl radical having 12 C atoms, and $R^6$ is hydrogen or $R^5$. Use is frequently made of technical mixtures which include a fraction of 50% to 90% by weight of the monoalkylated product, an example being Dowfax®2A1 (trademark of the Dow Chemical Company). Suitable emulsifiers are also found in Houben-Weyl, Methoden der organischen Chemie, volume 14/1, Makromolekulare Stoffe [Macromolecular compounds], Georg Thieme Verlag, Stuttgart, 1961, pages 192 to 208. Emulsifier tradenames are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, and Emulphor® NPS 25. Also suitable are copolymerizable emulsifiers which comprise a free-radically polymerizabie, ethylenically unsaturated double bond, examples being reactive anionic emulsifiers such as Adeka® Resoap SR-10.

The emulsion polymerization takes place in general at 30 to 130° C., preferably 50 to 90° C. The polymerization medium may be composed either only of water, or of mixtures of water and water-miscible liquids such as methanol. It is preferred to use just water. The emulsion polymerization may be carried out either as a batch operation or in the form of a feed process, including staged or gradient procedures. Preference is given to the feed process, in which a portion of the polymerization batch is introduced as an initial charge and heated to the polymerization temperature, polymerization is commenced, and then the remainder of the polymerization batch, typically via two or more spatially separate feeds, of which one or more comprise the monomers in pure form or in an emulsified form, is supplied continuously, in stages or under a concentration gradient to the polymerization zone, with the polymerization being maintained. In the polymerization it is also possible to include a polymer seed in the initial charge, in order, for example, to set the particle size more effectively.

The emulsion polymerization may be carried out in the presence of at least one protective colloid. This means that the protective colloids are included in the initial charge or supplied together with monomers to the polymerization vessel. In the emulsion polymerization they are preferably included in the initial charge, while any additionally added emulsifiers may be supplied together with the monomers in the course of the polymerization as well.

For the emulsion polymerization it is possible to use the typical and known auxiliaries, such as water-soluble initiators and chain-transfer agents. Water-soluble initiators for the emulsion polymerization are, for example, ammonium salts and alkali metal salts of peroxydisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one usually inorganic reducing agent and one organic or inorganic oxidizing agent. The oxidizing component comprises, for example, the initiators already specified above for the emulsion polymerization. The reducing components comprise, for example, alkali metal salts of sulfurous acid, such as sodium sulfite, sodium hydrogensulfite, alkali metal salts of disulfurous acid such as sodium disulfate, bisulfite addition compounds of aliphatic aldehydes and ketones, such as acetone bisulfite, or reducing agents such as hydroxymethanesulfinic acid and its salts, or ascorbic acid. The redox initiator systems may be used along with soluble metal compounds whose metallic component is able to occur in a plurality of valence states. Examples of typical redox initiator systems include ascorbic acid/iron(II) sulfate/sodium peroxydisulfate, tert-butyl hydroperoxide/sodium disulfite, tert-butyl hydroperoxide/Na hydroxymethanesulfinic acid or tert-butyl hydroperoxide/ascorbic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water which is acceptable in the dispersion, and the upper concentration by the solubility of the respective compound in water. In general the concentration is 0.1% to 30%, preferably 0.5% to 20%, more preferably 1.0% to 10%, by weight, based on the solution. The amount of the initiators is generally 0.1% to 10%, preferably 0.5% to 5%, by weight, based on the monomers to be polymerized. It is also possible for two or more different initiators to be used for the emulsion polymerization. For the purpose of removing the residual monomers, it is typical for initiator to be added after the end of the actual emulsion polymerization as well.

In the polymerization it is possible to use chain-transfer agents (molecular-weight regulators), in amounts, for example, of 0 to 0.8 part by weight, based on 100 parts by weight of the monomers to be polymerized, by means of which the molar mass is lowered. Suitability is possessed, for example, by compounds having a thiol group such as tert-butyl mercaptan, thioglycolic esters, e.g., 2-ethylhexyl thioglycolate, mercaptoethanol, mercaptopropyltrimethoxysilane, n-dodecyl mercaptan or tert-dodecyl mercaptan. It is additionally possible to use chain-transfer agents without a thiol group, such as C6 to C20 hydrocarbons which on hydrogen abstraction form a pentadienyl radical, e.g., terpinolene. In one preferred embodiment the emulsion polymer is prepared using 0.05% to 0.5% by weight, based on the monomer amount, of at least one chain-transfer agent.

In the emulsion polymerization, aqueous dispersions of the polymer are obtained with solids contents generally of 15% to 75%, preferably of 40% to 75%, by weight. For a high space/time yield of the reactor, dispersions with as high a solids content as possible are preferred. In order to be able to achieve solids contents >60% by weight, a bimodal or polymodal particle size ought to be set, since otherwise the viscosity becomes too high and the dispersion can no longer be handled. Producing a new particle generation can be accomplished by addition of seed (EP 81083), by addition of excess quantities of emulsifier or by addition of miniemulsions. A further advantage associated with the low viscosity at high solids content is the improved coating behavior at high solids contents. Producing one or more new particle generations can be done at any desired point in time. This point in time is guided by the particle size distribution that is desired for a low viscosity.

In one preferred embodiment the polymer has a core-shell morphology or is preparable by at least two-stage polymerization, the glass transition temperature of the core-forming polymer (A) being different by at least 10° C., preferably by at least 15° C. or at least 20° C., e.g., by 10 to 50° C., than the glass transition temperature of the shell-forming polymer (B), or the glass transition temperature of the polymer (B) formed in the first polymerization stage being different by at least 10° C., preferably by at least 15° C. or at least 20° C., e.g., by 10 to 50° C., than the glass transition temperature of the polymer formed in the second polymerization stage (A). This embodiment relates, therefore, to aqueous polymer dispersions in which the polymer particles have at least two mutually different polymer phases (A) and (B) having different glass transition temperatures. This has the advantage that sound deadener compositions produced therewith possess vibration-damping effects across a wider temperature range. The glass transition temperature of the core is preferably greater than the glass transition temperature of the shell.

With regard to the core-shell particles, the surface of the core is covered fully or at least partly with the shell-forming polymers. Core-shell particles preferably have an average particle diameter of 10 nm to 1 micrometer or of 20 nm to 500 nm, measurable using a dynamic light scattering photometer. Both for polymer (A) and for the different polymer (B), the polymers in question are preferably acrylate copolymers, the nature and amount of the monomers being such as to ensure at least the minimum difference in glass transition temperatures. Suitable acrylate copolymers for forming at least two-phase polymer particles are described in WO 2007/034933, EP 1520865, and DE19954619, for example.

Polymer dispersions having at least two-phase polymer particles are preferably obtainable by free-radical aqueous emulsion polymerization comprising the following steps:
a) polymerization of a first monomer charge M1 to form a polymer P1 having a theoretical glass transition temperature Tg(1) (according to Fox) and
b) polymerization of a second monomer charge M2 to form a polymer P2 having a theoretical glass transition temperature Tg(2) (according to Fox) that is different from Tg(1), in the aqueous dispersion of the polymer P1,
where at least one chain transfer reagent is used either during the polymerization of the monomer charge M1 or during the polymerization of the monomer charge M2.

By a theoretical glass transition temperature is meant, here and below, the glass transition temperatures Tg(1) and Tg(2), respectively, calculated according to Fox on the basis of the monomer composition of the monomer charge M1 and of the monomer charge M2, respectively. According to Fox (T. G. Fox, Bull. Am. Phys. Soc. (Ser. II) 1, 123 [1956] and Ullmann's Enzyklopädie der technischen Chemie, Weinheim (1980), pp. 17, 18), the glass transition temperature of copolymers at high molar masses is given in good approximation by $$1/Tg = x1/Tg(1) + x2/Tg(2) + \ldots + xn/Tg(n)$$

where $x1, x2, \ldots xn$ are the mass fractions $1, 2, \ldots, n$ and $Tg(1), Tg(2), \ldots, Tg(n)$ are the glass transition temperatures of the polymers composed in each case only of one of the monomers $1, 2, \ldots, n$, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook 3rd ed., J. Wiley, New York 1989.

With preference in accordance with the invention the monomer charge M2 is selected such that the theoretical glass transition temperature (according to Fox) of the resulting polymer phase P2 lies above the theoretical glass transition temperature of the polymer P1 prepared first. In that case the monomer charge M2 preferably has a composition which leads to a theoretical glass transition temperature Tg(2) for the polymer phase P2 which is above 30° C., preferably above 40° C., and more particularly in the range from 50 to 120° C. Where Tg(2) is greater than Tg(1), the monomer charge M1 preferably has a monomer composition which leads to a theoretical glass transition temperature Tg(1) for the resulting polymer phase P1 that is in the range from −40 to +40° C., preferably in the range from −30 to +30° C., and very preferably in the range from −10 to +25° C. Where Tg(1) is greater than Tg(2), the preferred glass transition temperatures of the polymer phase P1 are subject to the statement made above for P2 in the case of Tg(2) being greater than Tg(1). For the glass transition temperatures of the polymer phase P2, the statements made above for Tg(1) then apply correspondingly.

In the polymer dispersions of the invention, the weight ratio of the polymer phases to one another is in the range from 20:1 to 1:20, preferably 9:1 to 1:9. Preference is given in accordance with the invention to those polymer dispersions in which the fraction of polymer phase having the low glass transition temperature is predominant. Where P1, as is preferred in accordance with the invention, has the lower glass transition temperature, the ratio P1:P2 is situated more particularly in the range from 1:1 to 5:1 and more preferably in the range from 2:1 to 4:1. The weight ratios of the polymer phases P1 and P2 correspond approximately to the proportions of the monomer charges M1 and M2. In the case of Tg(1) being greater than Tg(2), the proportions P1:P2 are situated more particularly in the range from 1:1 to 1:5 and more preferably in the range from 1:2 to 1:4.

The sound deadener composition preferably comprises
(a) 5% to 20%, preferably 10% to 18% by weight of solids of the polymer dispersion,
(b) 40% to 90%, preferably 60% to 80% by weight of inorganic fillers,
(c) 0.1% to 3% by weight, preferably 0.1% to 0.5% by weight of fluorinated compounds,
(c) 10% to 40%, preferably 20% to 30% by weight of water, and
(d) 0% to 10%, preferably 0.1% to 1% by weight of auxiliaries.

Suitable inorganic fillers are, for example, calcium carbonate, kaolin, mica, silica, chalk, microdolomite, finely ground quartz, talc, clay, barium sulfate, argillaceous earth, iron oxide, titanium dioxide, glass powder, glass flakes, magnesium carbonate, aluminum hydroxide, bentonite, fly ash, kieselguhr, perlite and mica. Preference is given to using fillers in flake form such as mica, for example, alone or in combination with customary inorganic pigments such as calcium carbonate, kaolin, silica or talc. Preferred fillers are kaolin, chalk, microdolomite, finely ground quartz, and mica.

It is preferred to use 50 to 700 or 100 to 550 parts by weight of inorganic filler to 100 parts by weight of polymer dispersion, and preferably 30 to 150 or 40 to 120 parts by weight of fillers in flake form are used to 100 parts by weight of polymer dispersion.

Auxiliaries, used preferably at not less than 0.1% by weight, e.g., from 0.2% to 5% by weight, are, for example, thickeners, resins, plasticizers, organic and inorganic pigments, cosolvents, stabilizers, wetting agents, preservatives, foam inhibitors, glass beads or plastics beads, hollow glass or plastics bodies, antifreeze agents, dispersants, antioxidants, UV absorbers, antistats and pigment dispersants. One, two or more in combination of the auxiliaries may be used. Suitable cosolvents are, for example, ethylene glycol, ethylene glycol alkyl ethers (e.g., Cellosolve® products), diethylene glycol alkyl ethers (e.g., Carbitol® products), Carbitol acetate, Butylcarbitol acetate or mixtures thereof. Thickeners are, for example, polyvinyl alcohols, cellulose derivatives or polyacrylic acids in amounts, for example, of 0.01 to 4 or of 0.05 to 1.5 or of 0.1 to 1 parts by weight, based on 100 parts by weight of solid. Dispersants are, for example, sodium hexametaphosphate, sodium tripolyphosphates, or polycarboxylic acids. Antifreeze agents are, for example, ethylene glycol or propylene glycol. Foam inhibitors are, for example, silicones. Stabilizers are, for example, polyvalent metal compounds such as zinc oxide, zinc chloride or zinc sulfate. The auxiliaries are preferably used in an amount of at least 0.1% and are selected from thickeners, resins, plasticizers and pigment dispersants.

The quality of a sound deadener composition can be measured by measuring the bending oscillations in the resonance curve process according to ISO 6721-1 and ISO 6721-3. A measure of the vibration-damping effect is the loss factor tan delta. The maximum of the loss factor tan delta for sound deadener compositions of the invention is preferably in the range from −20 to +70° C. Where core-shell particles or other particles having a multiphase particle structure are used, the various polymer phases having different glass transition temperatures, there are in general at least two maxima for the loss factor at not less than two different temperatures. In this case preferably all of the maxima of the loss factor are situated in the range from −20 to +70° C.

The invention also provides a method for damping oscillations or vibrations of vehicle or machine components, where
  (1) a sound deadener composition described in more detail above is provided, and
  (2) the sound deadener composition is applied to a vehicle or machine component and dried.

Application may take place in a usual way, as for example by spreading, rolling or spraying. The amount applied is preferably from 1 to 7 kg/m² or from 2 to 6 kg/m² after drying. Drying may take place at ambient temperature or preferably by application of heat. The drying temperatures are preferably from 80 to 210° C. or from 90 to 180° C. or from 120 to 170° C.

The sound deadener composition may be employed, for example, in vehicles of all kinds, more particularly road going motor vehicles, automobiles, rail vehicles, and also in boats, aircraft, electrical machinery, construction machinery, and buildings.

The sound deadener compositions according to the invention have good performance properties in terms of high ease of application and good vibration-damping properties and are distinguished by a low water absorption capacity.

EXAMPLES

Materials Used:
Lodyne® 2010: perfluoroalkyl-substituted carboxylic acid
Lodyne® 2000: perfluoroalkyl-substituted carboxylic acid
Kappaphob® TAP 30: fluorocarbon polymer emulsion
Ombrelub® 533: calcium stearate dispersion
Poligen® MW 1: montan ester wax dispersion (38-42%)
Basophob® WDS: paraffin wax emulsion (approx. 60%)
Lurotex TX 2504: acrylate copolymer, fluorinated
Disponil® FES77 Fatty alcohol ether sulfate, sodium salt (32-34% strength aqueous solution)
Dowfax® 2A1 Alkyldiphenyl oxide disulfonate (45% aqueous solution)
Emulphor® NPS 30-31% strength by weight aqueous solution of the sodium salt of the sulfuric acid monoester of ethoxylated p-nonylphenol with 25 mol/mol of ethylene oxide units.

Example 1

In a 2-liter polymerization reactor with anchor stirrer and heating/cooling means, a mixture of 180 g of deionized water, 3 g of acrylic acid and 3.12 g of ammonia is heated to a temperature of 90° C. under a nitrogen atmosphere. Then, at the aforementioned temperature, a portion of 41 g of feed 1 and a portion of 10.26 g of a 7% strength Na peroxodisulfate solution are added. Feed 1 is an emulsion prepared from
  195 g of deionized water
  18.75 g of Disponil® FES77
  3.33 g of Dowfax® 2A1
  3 g of tert-dodecyl mercaptan
  346.2 g of n-butyl acrylate
  253.8 g of styrene
Feed 2 is an initiator feed consisting of a 47.14 g Na peroxodisulfate solution with a 7% concentration.

The emulsion feed is metered in continuously over 4 hours, the initiator feed over 4.5 hours. After a 30-minute postreaction phase, the pH is adjusted over 30 minutes using a 25% strength sodium hydroxide solution. The chemical deodorization is carried out over 1 hour with a 10% strength tert-butyl hydroperoxide solution and with a 12% strength sodium acetone-bisulfite solution.

Example 2

Prepared like example 1, but with varied monomer composition.
  Feed 1 is an emulsion prepared from:
  195 g of deionized water
  18.75 g of Disponil® FES77
  3.33 g of Dowfax® 2A1
  3 g of tert-dodecyl mercaptan
  345 g of n-butyl acrylate
  307.8 g of methyl methacrylate

Example 3

Prepared like example 1, but with varied monomer composition.
  Feed 1 is an emulsion prepared from:
  195 g of deionized water
  18.75 g of Disponil® FES77
  3.33 g of Dowfax® 2A1
  3 g of tert-dodecyl mercaptan
  245 g of methyl methacrylate
  292.2 g of ethylhexyl acrylate

Example 4

Prepared like example 1, but with varied monomer composition.
  Feed 1 is an emulsion prepared from:
  195 g of deionized water
  18.75 g of Disponil® FES77

3.33 g of Dowfax® 2A1
3 g of tert-dodecyl mercaptan
294 g of ethylhexyl acrylate
306 g of styrene
Sound deadener compositions are prepared from
24 g of water
37.2 g of polymer dispersion (50% solids content), as per examples 1 to 4 above hydrophobicizing agent (see table 1)
38.6 g of muscovite mica GHL 144
77.2 g of Omyacarb® 20 BG (chalk)

Films were prepared from the sound deadener compositions with binder as per example 1, and the water absorption of the films was measured by the method below.

Sample dimensions: 20×15 mm
Number of specimens: 3

One day following preparation of the sound deadener compositions, films with a thickness each of 2 mm are drawn down onto a Teflon-coated glass plate. After a day of drying at room temperature (20° C.), the films are stored at 140° C. for 15 minutes. Test specimens are punched from the cooled films. The test specimens are weighed and then placed in polyethylene beakers filled with drinking water. The specimens are removed from the water after 24 hours, placed between a hand towel, loaded briefly with a 100 g weight, and weighed. The specimens are returned to the beakers, stored for a week, and then weighed again as described above.

The water absorption is calculated as follows:

water absorption [24 h]=$(m1-m0)/m0 \times 100\%$ water absorption [1 week]=$(m2-m0)/m0 \times 100\%$ m0: mass of the specimen before storage in water
m1: mass of the specimen after 24 h of water storage
m2: mass of the specimen after 1 week of water storage
The results are set out in table 1.

TABLE 1

Results of the water absorption measurements

| Example | Hydrophobi-cizing agent (0.5%) | Water absorption 24 h | Water absorption 1 week |
|---|---|---|---|
| B1 | Lodyne ® 2010 | 7% | 12% |
| B2 | Lodyne ® 2000 | 9% | 13% |
| B3 | Lurotex ® TX 2504 | 11% | 15% |
| B4 | Kappaphob ® TAP 30 | 12% | 17% |
| B5 | Poligen ® MW 1 | 15% | 20% |
| B6 | Basophob ® WDS | 20% | 26% |
| B7 | Ombrelub ® 533 | 41% | 45% |

The results show that particularly low water absorption is achieved with examples B1 and B2.

Example B8

Hydrophobicizing Agent in the Emulsion Feed

In a 2-liter polymerization reactor with anchor stirrer and heating/cooling means, a mixture of 180 g of deionized water, 3 g of acrylic acid, and 3.36 g of ammonia is heated to a temperature of 85° C. under a nitrogen atmosphere. Then, at the aforementioned temperature, a portion of 41.54 g of feed 1 and a portion of 48 g of 2% strength Na peroxodisulfate solution are added.

Feed 1 is an emulsion prepared from
155 g of deionized water
14.52 g of Emulphor® NPS
63.16 g of Lodyne® 2010
1.2 g of tert-dodecyl mercaptan
345 g of n-butyl acrylate
246 g of methyl methacrylate Feed 2 is an initiator feed consisting of 48 g of Na peroxodisulfate solution with a 2% concentration.

The emulsion feed and the initiator feed are metered in continuously over 3.5 hours. After a 30-minute postreaction phase, the product is cooled to 65° C. Chemical deodorization is carried out over 1 hour with a 10% strength tert-butyl hydroperoxide solution and with a 10% strength ascorbic acid solution. The pH is subsequently adjusted with a 5% sodium hydroxide solution over 5 minutes.

Example B9

Prepared as for example B8, but with varied hydrophobicizing agent.
Feed 1 is an emulsion prepared from
183.88 g of deionized water
14.52 g of Emulphor® NPS
34.29 g of NH4 stearate
1.2 g of tert-dodecyl mercaptan
345 g of n-butyl acrylate
246 g of methyl methacrylate Example B10

Prepared as for example B8, but with varied hydrophobicizing agent.
Feed 1 is an emulsion prepared from
183.88 g of deionized water
14.52 g of Emulphor NPS
25.71 g of NH4 stearate
1.2 g of tert-dodecyl mercaptan
345 g of n-butyl acrylate
246 g of methyl methacrylate Sound deadener compositions are prepared as described above but without addition of additional hydrophobicizing agent. The water absorption of films produced from the sound deadener compositions was measured as described above. The results are set out in table 2.

TABLE 2

Results of water absorption measurement

| Example | Hydrophobi-cizing agent (0.5%) | Water absorption 24 h | Water absorption 1 week |
|---|---|---|---|
| B8 | Lodyne ® 2010 | 9% | 12% |
| B9 | NH4 stearate | 12% | 24% |
| B10 | NH4 stearate | 15% | 26% |

The results show that particularly low water absorption is achieved with example B8.

The invention claimed is:
1. A method for damping an oscillation or a vibration of a vehicle, a vehicle bodywork part, or a machine component, the method comprising:
applying a composition comprising a polymer dispersed in water, an inorganic filler, and at least one fluorinated compound to a vehicle, a vehicle bodywork part, or a machine component in need thereof; and
drying the composition,
wherein:

the polymer is obtained by a process comprising emulsion polymerization of a free radically polymerizable monomer, and has a glass transition temperature of from −60° C. to +60° C.; and the at least one fluorinated compound is selected from the group consisting of a perfluoroalkyl-substituted carboxylic acid, a perfluoroalkyl-substituted carboxylic acid salt, a fluorocarbon resin, a surface-active fluoroaliphatic polymeric ester, and a fluorine-comprising acrylate-based copolymer.

2. The method of claim 1, wherein the fluorinated compound is a perfluoroalkyl-substituted carboxylic acid or a perfluoroalkyl-substituted carboxylic acid salt.

3. The method of claim 2, wherein the perfluoroalkyl-substituted carboxylic acid and the perfluoroalkyl-substituted carboxylic acid salt comprise a perfluoroalkyl group of formula $$-C_nF_{2n+1},$$

wherein
the perfluoroalkyl group is linear or branched,
n is a number of from 1 to 16, and
the salt is at least one selected from the group consisting of an ammonium salt, an alkali metal salt, and an alkaline earth metal salt.

4. The method of claim 3, wherein n is a number of from 4 to 14.

5. The method of claim 3, wherein n is a number of from 6 to 12.

6. The method of claim 1, wherein the polymer is at least one selected from the group consisting of an acrylate homopolymer, an acrylate copolymer, and an acrylate polymer blend.

7. The method of claim 1, wherein a content of the fluorinated compound is from 0.1% to 3% by weight.

8. The method of claim 1, wherein the glass transition temperature of the polymer is from −30° C. to +60° C.

9. The method of claim 8, wherein the glass transition temperature of the polymer is from −20° C. to +55° C.

10. The method of claim 1, wherein the polymer comprises at least 60% by weight of a principal monomer, which is at least one selected from the group consisting of a C1 to C20 alkyl (meth)acrylate, a vinyl ester of a carboxylic acid comprising up to 20 C atoms, a vinylaromatic comprising up to 20 C atoms, an ethylenically unsaturated nitrile, a vinyl halide, a vinyl ether of an alcohol comprising 1 to 10 C atoms, and an aliphatic hydrocarbon comprising 2 to 8 C atoms and one or two double bonds.

11. The method of claim 1, wherein the polymer comprises at least 60% by weight of a $C_1$ to $C_{10}$ alkyl (meth)acrylate.

12. The method of claim 11, wherein the polymer comprises at least 80% by weight of the $C_1$ to $C_{10}$ alkyl (meth)acrylate.

13. The method of claim 11, wherein the polymer comprises at least 95% by weight of the $C_1$ to $C_{10}$ alkyl (meth)acrylate.

14. The method of claim 1, wherein the polymer
either has a core-shell morphology comprising a core-forming polymer and a shell-forming polymer, wherein a glass transition temperature of the core-forming polymer is different by at least 10° C. from a glass transition temperature of the shell-forming polymer,
or is obtained by a process comprising a two-stage polymerization, wherein a glass transition temperature of a polymer formed in a first polymerization is different by at least 10° C. from a glass transition temperature of a polymer formed in a second polymerization.

15. The method of claim 1, wherein the composition comprises:
(a) from 5% to 20% by weight of the polymer,
(b) from 40% to 90% by weight of the inorganic filler,
(c) from 0.1% to 3% by weight of the fluorinated compound,
(d) from 10% to 40% by weight of water, and
(e) from 0% to 10% by weight of an auxiliary.

16. The method of claim 1, wherein
the inorganic filler is at least one selected from the group consisting of kaolin, chalk, microdolomite, finely ground quartz, and mica, and
the auxiliary is not less than 0.1% by weight and is at least one selected from the group consisting of a thickener, a resin, a plasticizer, and a pigment dispersant.

17. The method of claim 11, wherein the composition comprises:
(a) from 10% to 18% by weight of the polymer,
(b) from 60% to 80% by weight of the inorganic filler,
(c) from 0.1% to 0.5% by weight of the fluorinated compound,
(d) from 20% to 30% by weight of water, and
(e) from 0.1% to 1% by weight of the auxiliary.

18. The method of claim 1, wherein
the polymer comprises two polymer phases with different glass transition temperatures, and
a weight ratio of one polymer phase with a low glass transition temperature to the other polymer phase with a high glass transition temperature is from 2:1 to 5:1.

* * * * *